Inventor.
Hulbert Sanner.

Patented June 16, 1931

1,810,732

UNITED STATES PATENT OFFICE

HULBERT SANNER, OF CHICAGO, ILLINOIS, ASSIGNOR TO LOTHAR A. EDERER, OF CHICAGO, ILLINOIS

PROGRAM MACHINE

Application filed September 4, 1923. Serial No. 660,694.

My invention relates to improvements in program machines wherein all the switching, controlling and operating elements are electrically operated and controlled. It comprises a plurality of separate switches, there being at least one each for minute, hour, day and perhaps other greater or smaller time intervals. These switches or control elements all operate in unison, the shorter time element switches periodically operating the longer time element switches, at the end of each recurring cycle of operation of the shorter one.

By the use of a plurality of separate inter-controlled time element controlling switches, it is possible in my program machine to produce any desired result in time or control by merely adding the necessary number of switches or levels.

Associated with the switches are a plurality of electric control circuits so arranged and combined with an operating or program panel that by plugging in on the panel, the apparatus may be set so that any selected time circuit may be closed when that time is reached, and a signal given or a current sent or a time recorded.

There is, therefore, in combination with the electric switches, a plurality of separate electric circuits, there being working circuits by which one switch actuates another and program circuits which when closed by the time switches through a plugged circuit in the panel gives a signal outside the system.

The arrangement of the panel and its association with the other parts is such that all circuits closed through the switches and their associated parts to the panel, are open at the panel except where the operator has plugged in a particular circuit to close it.

One object of my invention is to provide for the use of a plurality of separate control and selecting electric switches inter-related and inter-locking and working in unison through a manually adjusted program panel to operate machinery at predetermined time intervals when the associated switches are in a predetermined series of relations.

Another object is to provide a program machine which will be compact and simple, easy to assemble and have a minimum of working parts. Another object is to provide in a program machine a series of separate inter-locking time switches whereby the adding to or subtracting from the program machine of hour, day, or week, or larger time unit controls may be effected merely by changing the number of series of switches or levels and wherein from a single master clock by merely adding to the number of switches in any single stage or in any plurality of stages, the number of separate programs may be indefinitely expanded.

My invention is illustrated more or less diagrammatically in the accompanying drawings, wherein:—

Like parts are designated by like characters throughout the specification.

General mechanism

A is a wall panel of the usual type. It carries a switch control assembly at the top and a plurality of program panels $A^1$ and $A^2$, though there may be more or less or but a single large one as the case may be. Mounted on the wall panel A are the U-shaped bracket members $A^4$ and $A^5$. The entire switch, solenoid and control assembly is pivoted on the hinge pin $A^6$ on the bracket $A^5$ and adapted to be locked in normal working position in front of the panel A by means of the pins $A^7$, $A^7$ engaging the bracket $A^4$. These pins may be withdrawn and the assembly swung out on the hinge pin $A^6$ when it is desired to get at the back of the assembly for the purpose of making adjustments and wiring, for it will be understood that the various conductors terminating at the switch assembly come out to it through the wall panel. The program panels $A^1$ and $A^2$ are shown because we have illustrated and discussed below a plurality of separate minute and hour switches and it might be desirable to have one program machine which would operate a plurality of separate programs, in such case there would be one panel for each couple of minute and hour switches and a separate program could be set on each panel.

The switch assembly is built up of the horizontal cross pieces $A^8$, $A^9$ pivoted on the pin $A^6$ and a flat plate $A^{10}$ and comprises the master clock relay $E^2$, the day calendar switch $A^{12}$ and a bank of motor magnets $A^{13}$, the minute switch $A^{14}$ and the hour switch $A^{15}$.

The mechanism of the various hour and minute switches is substantially the same and a description of one will suffice for all. The calendar switch for day to day operation, however, is somewhat different and will be separately described.

Figure 1:
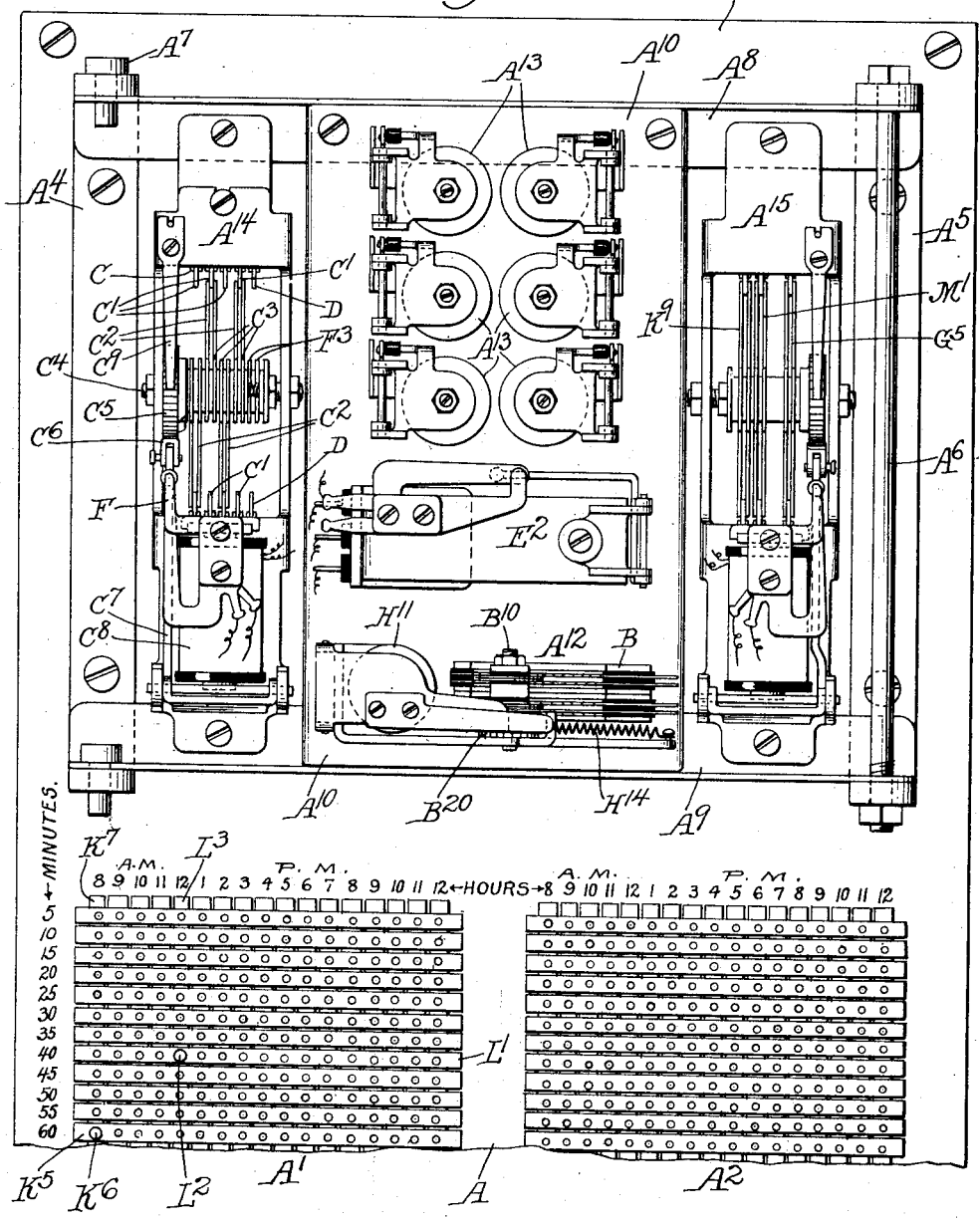
Figure 1 is a front elevation of the switch and control assembly.
Figure 2:
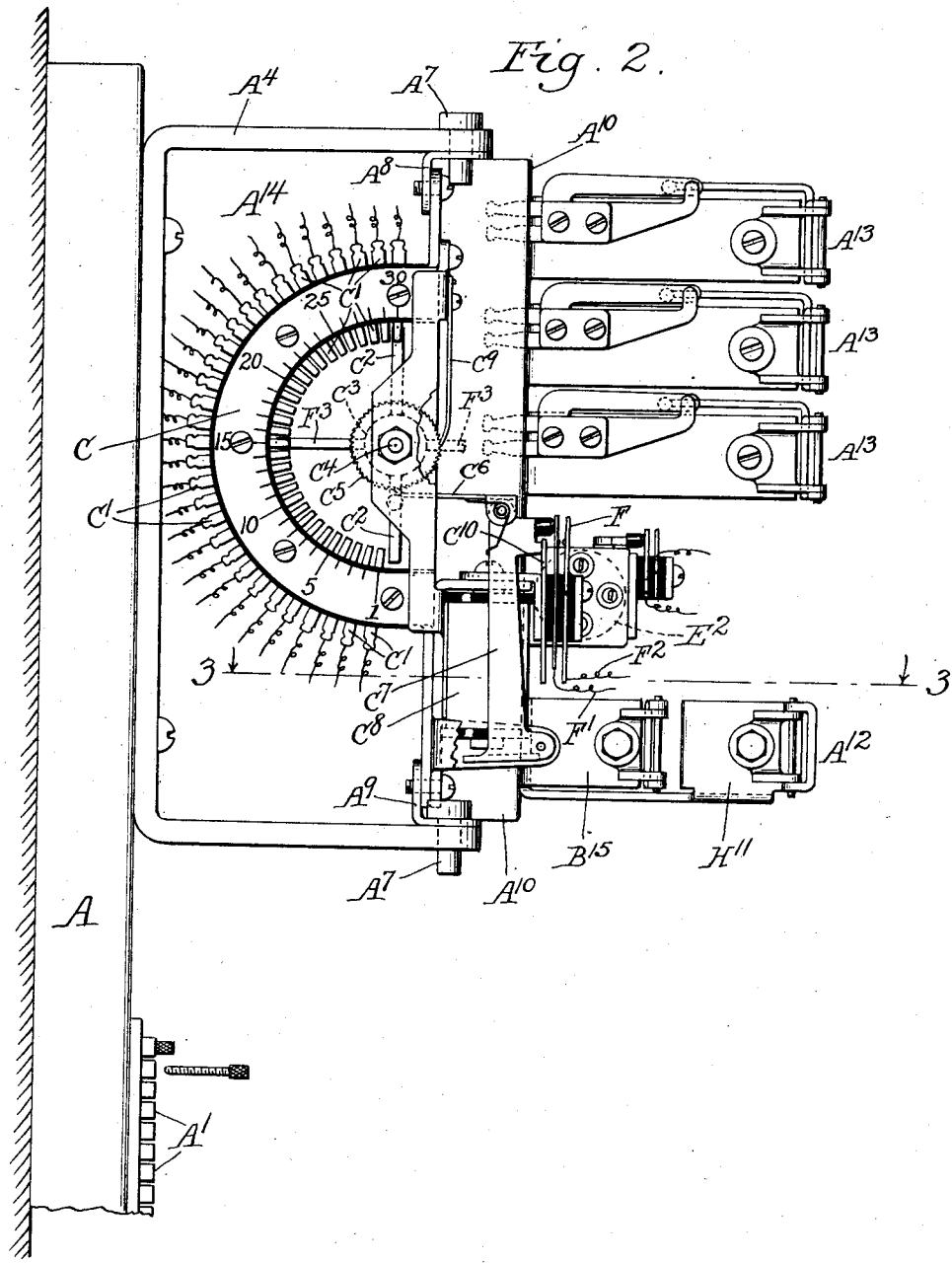
Figure 2 is a side elevation looking at Figure 1 from the left.

In Figure 2 is shown a minute switch comprising two identical levels associated with a single operating shaft and arranged one above the other along the shaft. The first level contains commutator bars from 1 to 30, the second, bars from 31 to 60 and there are two diametrically opposed wipers one associated with each level so that when the wiper on the first level leaves the bar 30, the wiper on the second level engages the bar 31 and when the wiper on the second level leaves the bar 60 the wiper on the first level reengages the bar 1.

Each level comprises a semi-circular insulating segment C, carrying a plurality of radial commutator bars $C^1$, the outer ends of which are arranged for attachment to conductors. The inner ends of these bars are flattened to engage the wiper $C^2$ which projects from a hub $C^3$ on a shaft $C^4$, there being two of these hubs and wipers for the two levels and a single ratchet wheel $C^5$ mounted on the shaft and adapted to be moved forward step by step by means of a dog $C^6$ on the lever arm $C^7$ reciprocated by motor magnet $C^8$, which when energized compresses the spring $C^{10}$ and when de-energized permits the spring to move the lever and dog back to rotate the wheel. $C^9$ is a stop spring engaging the ratchet wheel to prevent backward movement of the wipers. The motor magnet $C^8$ is energized once each minute by a current sent from a master clock so that the wipers on the two minute levels move step by step one minute per step, the minute switch making one complete revolution of 60 steps in one hour.

The hour switch is exactly the same in general arrangement and operation as the minute switch except that there is but one level and that there are only twenty-five bars instead of thirty in each level. This being the case, I have not specifically shown or described the details of the hour switch because a description of the minute switch suffices. The hour switch comprises a single semi-circular segment with twenty-five commutator bars and two wipers on the same level, the wiper supporting shaft makes one half a revolution every twenty-four hours and when one wiper has moved from 1 to 24, or from 1 a. m. to 12 m. m. and from 1 p. m. to 12 n. the other wiper goes into action. The use of two wipers in the same plane permits use of a continuous rotary motion with a semi-circular commutator, thus making it possible for all the wiring on the reverse ends of the commutator bars to be assembled on one side of the commutator segment.

The step by step motion of the wipers for the hour switch is as above indicated, obtained in exactly the same way as the minute switch but the means for exciting the hour motor magnets are different in that they depend not upon the constant minute by minute operation of a master clock but upon the closing of a circuit by a switch associated with the minute switch so that there will be one forward step from one hour to another at the end of sixty minutes or each complete rotation of the minute switch.

In order to obtain this control, there is associated with the minute switch a separate operating level D, which is structurally identical with the other levels of the minute switch except that only a few of the commutator bars are in circuit, the others are left blank and the wiper travels along them with the rotation of the minute shaft without producing any effect. When the operating wiper reaches the live commutator bars, a circuit is closed through the hour switch motor magnet and one hour step is taken. The forward step from one hour to the next is taken as the minute wiper reaches the one minute before the hour position so that the circuit will be prepared for the even hour when that hour starts.

Figure 3:
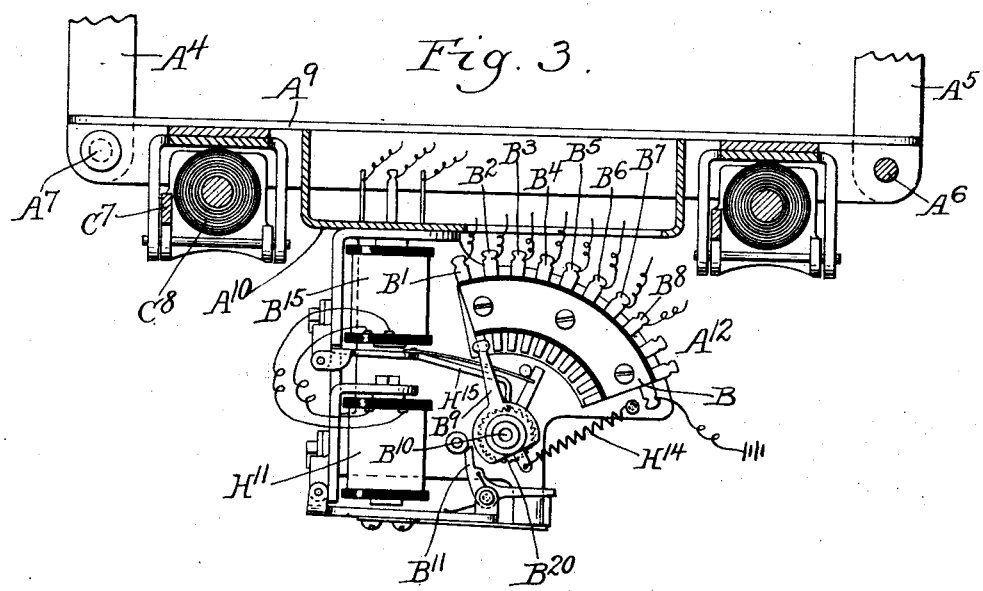
Figure 3 is a section along the line 3—3 of Figure 2.

Referring now to the calendar switch shown in Figure 3, there is provided an insulated segment B, which carries radial commutator bars $B^1$, $B^2$, $B^3$, $B^4$, $B^5$, $B^6$, $B^7$, and $B^8$. The first seven bars each represent one day in the week and the eighth is for a reset connection. $B^9$ is a wiper or switch arm on a shaft $B^{10}$ and is adapted to move forward step by step to come into contact with successive commutator bars. The rotation of this wiper is caused by a dog $B^{11}$ engaging a ratchet wheel $B^{20}$ and reciprocated by a motor magnet $H^{11}$. A spring $H^{14}$ resists the rotation of the wiper and a latch $H^{15}$ is provided engaging teeth on the ratchet to prevent movement in the reverse direction when the dog $B^{11}$ is out of action. $B^{15}$ is a delayed action relay adapted when excited to release the latch $H^{15}$ to permit the wiper to return to starting position under the pull of the spring $H^{14}$, after the wiper has moved from the bar $B^1$ representing Monday to and beyond $B^7$ representing Sunday. The relay $B^{15}$ is in circuit with the contact bar $B^8$ so that when the motor magnet $H^{11}$ has moved the wiper to the contact $B^8$, the relay $B^{15}$ will be excited but because its action is delayed by the slow acting relay $J^4$ motor magnet $H^{11}$ will let go first while the relay $B^{15}$ is still holding the latch out so that the wiper may go back to its initial position in contact with the commutator $B^1$.

It will be noted from the above that there are three separate switch groups, a minute switch group with its shaft, an hour switch group with its shaft, and a calendar switch group with its shaft, though for the purpose of having a plurality of separate programs, it might under some conditions, be desirable to mount on the hour and minute switch shafts, a plurality of separate hour and minute switches in which case each such couple of hour and minute switches would be associated with a separate program panel so that separate programs might be worked out with different couples of hour and minute switches. This would not normally necessitate any change in the calendar switch because ordinarily a program is the same from day to day, though it is conceivable that under some conditions the calendar switch might be wired into the program bank, in which case, if different programs were to be used, it might be desirable to have a plurality of calendar switches.

The working circuits, electric or motor magnets, delayed action features, switches and the like which are shown diagrammatically in the wiring diagram will be discussed in connection with the discussion of the wiring diagram only. It will be understood that there are a plurality of separate switches, magnets, relays and the like to cause proper operation of the device and a proper inter-relation and cooperation and timing of the various parts.

In order to permit a proper setting up and selection of the program, the large number of hour and minute contact bars are needed. There must be a contact bar for every one of sixty minutes and a contact bar for every one of twenty-four hours and conductors must lead from all these contact bars to the program panel. Or at least it must be possible to provide such conductors if desired though for individual programs some of the minute and even hour wires may be omitted if the times represented by them are not to be used in the program. The circuit is closed through the selected hour contact bar and the selected minute contact bar so that when the hour and minute wipers are on the corresponding commutator bars, the circuit is closed and the bell is rung or the machine is operated or the signal is given or the card is punched as the case may be.

Electric circuits

In my apparatus I use three separate groups of electric circuits. The first is the master clock circuit including, or at least controlled and actuated by the master clock so as to send a working impulse into my apparatus once each minute. This circuit forms no part of the present invention. Suffice it to say that this circuit is open and closed once each minute by any type of master clock and actuates the minute switch motor magnet once each minute to start the whole chain of operation.

The second is the working circuit by which the minute switch as it rotates in response to the driving force from the master clock causes the correct timing rotation of the hour switch and the calendar switch and causes the proper timing and inter-cooperation of the moving parts which combine to form the time control element in my program machine.

The third is the program circuit which works through the program panel and the hour and minute commutator bars to cause an electric impulse to be set up when the circuit is closed through predetermined hour and minute points on the program panel.

Master clock circuit

E is a master clock associated with a source of electric power not shown and adapted to close a circuit through the conductor $E^1$, the master clock relay $E^2$ and the conductor $E^3$ once every minute. When the master clock relay $E^2$ is energized, the switch $E^4$ is closed and a current then flows from the ground through the conductor $E^5$, switch $E^4$, conductor $E^6$, minute switch motor magnet $C^8$, conductor $E^7$, battery $E^8$, and back to the ground. This causes the motor magnet $C^8$ to operate once to move the minute switch forward one step and this continues minute by minute as long as the master clock continues to operate.

Working circuit

When the motor magnet $C^8$ is energized, the switch F is closed and a current passes from the ground through the conductor $F^1$, switch F, conductor $F^2$, to the wiper $F^3$ of the minute operating switch D and nothing happens so long as the wiper is in contact with the dead commutator bars. As the minute switch rotates, however, the wiper will finally come in contact with the bar 59 and when this happens the circuit is continued through the conductor $F^4$, the hour switch motor magnet $B^{12}$, the conductor $B^{13}$, battery $B^{14}$, back to the ground. This movement is repeated once every hour and since there are as shown, twenty-five bars in the hour switch commutator, it is necessary to provide some additional means to step from No. 25 to No. 1 without waiting for a second engagement with the 59 minute contact on the minute operating level.

(It would be possible to dispense with the means which I am about to describe if there were but twenty-four contact members or commutator bars in the hour switch but for manufacturing reasons it is preferable to have twenty-five.)

At the end of the twenty-fourth hour the engagement of the wiper on the minute operating switch with the commutator bar 59 results in a movement of the hour switch wiper from twenty-four to twenty-five. The next forward movement of the minute switch brings the wiper into engagement with the sixty minute bar on the minute operating switch. Once each day this results in the closing of the following circuit:

From the ground through conductor $F^1$, switch F, conductor $F^2$, wiper $F^3$, bar 60 in the minute operating switch, conductor G, relay $G^1$, conductor $G^2$, switch $G^3$, which is normally closed, conductor $G^4$, bar 25 of the hour operating switch, wiper $G^5$, which wiper is in contact with the bar 25 only once every twenty-four hours, conductor $G^6$, battery $G^7$, back to the ground. This circuit is thus closed through the hour switch only once every twenty-four hours, through bar 25 of the hour operating switch, and the other times when the wiper $F^3$ passes over the bar 60 in the minute operating switch, the circuit remains open. When the circuit is closed, the relay $G^1$ is energized and the switch $G^6$ is closed and a circuit is closed from the ground through conductor $G^7$, switch $G^6$, conductor $G^8$, motor magnet $B^{12}$, conductor $B^{13}$, battery $B^{14}$, back to the ground. This energizes the hour motor magnet $B^{12}$, a second time and causes a rotation of the shaft associated with the hour switch to move the wiper $G^5$ out of contact with the bar 25 and bring it into contact with bar 1 for one o'clock or the first hour. When the relay $G^1$ is energized it also closes the make-before-break switch $G^{18}$ opening that part of the switch $G^3$ which communicates with the circuit $G^4$ transferring the circuit G from the hour switch to a circuit through the conductor $G^9$, conductor $B^{13}$, to the battery $B^{14}$. Under these conditions the circuit is as follows:

From the ground through battery $B^{14}$, conductor $B^{13}$, conductor $G^9$, switch $G^{18}$, switch $G^2$, conductor $G^2$, relay $G^1$, conductor G, bar 60, wiper $F^3$, conductor $F^2$, switch F, conductor $F^1$ to the ground.

The switch F is closed every minute but nothing happens. The minute switch is closed every hour at 60 and nothing happens. But when $G^5$ is closed every twenty-four hours at 25 since the minute switch and switch F are simultaneously closed operation takes place. The shunt circuit which short circuits the hour switch as soon as the connection has been made is provided for the purpose of protecting the comparatively delicate mechanism of the hour switch and making sure that should there be any inaccuracy, or improper timing of the hour switch or slipping of the parts still the circuit will be closed long enough to insure proper operation. When the motor magnet is energized and the circuit is closed, the dog is pulled back and as soon as the circuit is opened at the master clock the motor magnets are released and the springs move the parts to the next position. Every time the circuit is opened the spring $C^{10}$ and $C^7$ throw the switches into a position of preparedness for the next operation. When the wiper $F^3$ engages the one minute conductor bar on the operating switch, we have a circuit, at the time that the master clock closes the switch F, from the ground, through conductor $F^1$, switch F, conductor $F^2$, wiper $F^3$, bar 1, conductor H, relay $H^1$, make-before-break switch $H^2$ which is normally closed, conductor $H^3$, bar 1, of the hour operating switch, wiper $G^5$, conductor $G^6$, battery $G^7$ back to the ground. The two ends of the wiper $G^5$ are inter-changeable as the hour switch rotates and the circuit will be transferred from the upper to the lower end of the wiper $G^5$ when the step is made from 25 to 1.

The closing of the circuit through the one minute commutator bar and the one hour commutator bar results in energizing the relay $H^1$ which closes the switch $H^4$ opening the contact between the switch $H^2$ and the conductor $H^3$; there is then a circuit from the grounded battery $H^6$, conductor $H^7$, conductor $H^8$, switch $H^4$, switch $H^2$, relay $H^1$, conductor H, bar 1, wiper $F^3$, conductor $F^2$, switch F, conductor $F^1$, back to the ground, this keeps the relay $H^1$ energized through a circuit which omits any part of the hour switch. At the same time a circuit is closed from the ground through conductor $H^9$, conductor $H^{10}$, calendar switch motor magnet $H^{11}$, conductor $H^{12}$, switch $H^5$, conductor $H^8$, conductor $H^7$, battery $H^6$ to the ground. This energizes the calendar switch motor magnet $H^{11}$ and operates the calendar switch making one step in advance from one day to the next. This circuit is closed only when the wiper $G^5$ in the operating hour switch is in engagement with the one hour commutator bar. Thus the calendar switch shifts from one day to the next only at one minute after one o'clock each day. It would be possible, of course, to change the arrangement so as to have the calendar switch change at any hour in the day but it is most convenient to start up so that it will change at night and one o'clock is a convenient time.

Because the calendar switch has only a comparatively small number of commutator bars, it cannot operate on a continuous circular movement as do the other switches and it is therefore necessary to provide a reset mechanism which will automatically return the wiper to the Monday position after it has reached the Sunday position. This is done as follows:

The wiper B⁹ is moved forward a step at a time until it reaches the Sunday commutator bar. At one minute after one o'clock on Monday morning, the wiper will be moved forward to the next commutator bar but this is not the Monday bar, it is the reset commutator bar. At this time a circuit is closed from the grounded battery H⁶, conductor H⁷, conductor J¹ through wiper B⁹, reset commutator bar B⁸, conductor J¹³, slow acting relay J⁴, conductor J⁵, back to the ground. This energizes the slow acting relay J⁴ to close the switch J⁶. This in turn, closes a circuit from the grounded battery H⁶, conductor H⁷, conductor J⁷, switch J⁶, conductor J⁸, relay magnet J⁹, conductor H⁹, to the ground. When this magnet J⁹ is energized it pulls down the reset dog H¹⁵, to release the ratchet wheel associated with the wiper B⁹, and permits the spring B¹³ to throw the wiper back to the Monday position.

The various operations above described can take place in the various circuits indefinitely and every time the master clock sends an impulse, the minute switch moves forward one step. Every time the hour switch has moved forward twenty-four steps the additional step is automatically taken and it starts again, on its twenty-four hour circuit and every time the hour switch makes a complete circuit the calendar switch moves one step and every time the calendar switch has made seven steps, it is automatically returned to the starting position. The connection between these various steps and the control and operating mechanism are all electrical and there is no mechanical control whatever except the driving force of the motor magnet associated with its return spring which in every case gives a step by step reciprocating movement to move a ratchet wheel with its associated wipers forward a step at a time. Thus all parts are mechanically independent one of another.

The hour and minute switches above referred to have each associated with them a working or operating switch which switches have nothing to do with the program circuit but it is their function as above pointed out to time, operate and control the program switches or the program levels of the minute and hour switches.

*Program circuit*

Figure 4:
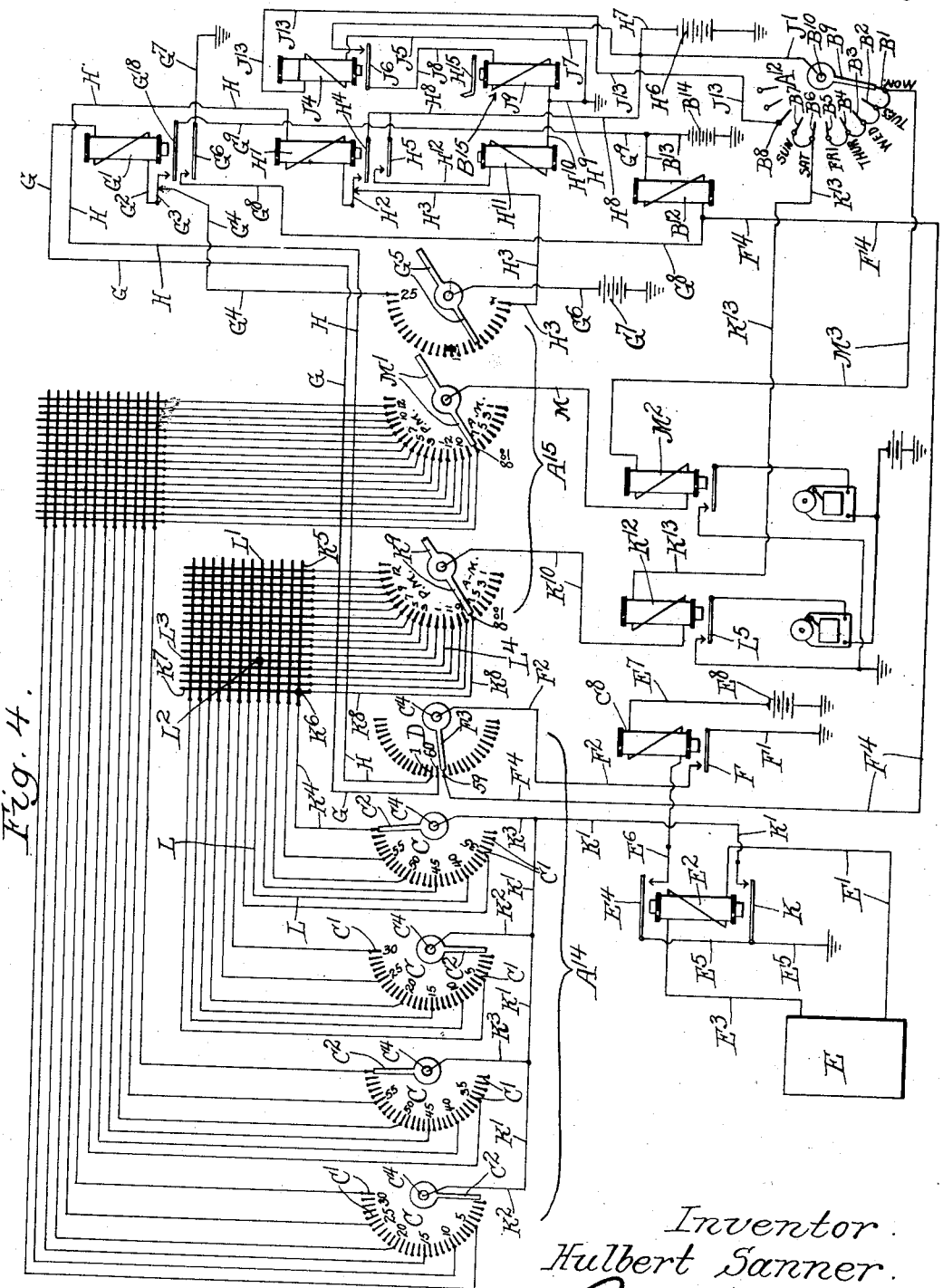
Figure 4 is a wiring diagram with some circuits omitted.

I have illustrated two hour switches and two minute switches, the minute switches being divided as above suggested into two levels. A description of one hour switch and one minute switch will suffice for both. In the interest of clearness, I have not shown the conductors leading from all the minute commutator bars and under some conditions when the apparatus is set up some of the minute commutator bars and some of the hour commutator bars may be left blank or not connected up if it is expected that the program to be used will not need these connections though they might all be connected up if that were desired. The circuit through the program part of the hour and minute switches is closed once every minute when the relay E² is energized by the master clock. This closes the switch K and there is then a circuit from the ground through conductor E⁵, switch K, conductor K¹, with branches K², K³, leading respectively to the 1 to 30 and 31 to 60 minute levels of the minute switches. Assuming that the parts are in position shown in Figure 4, a circuit will lead from conductor K³, through wiper C² to the minute contact 60, conductor K⁴, to the program panel strip K⁵, where it terminates unless one of the program panel pins have been inserted as at K⁶ in line with the panel strip K⁷ which is in communication with the conductor K⁸ leading to the eight o'clock commutator bar which in turn is connected to a wiper K⁹ on the hour switches. The circuit continues through the conductor K¹⁰ to relay K¹², conductor K¹³, to the Saturday and Sunday bars of the calendar switch so that only when the switch K is closed and the wiper B⁹ is in contact with Saturday and Sunday bars of the calendar switch will there be a closure of this particular program circuit and this circuit under these conditions will be closed only at eight o'clock a. m. on Saturday and Sunday.

A circuit may be closed from the ground to the conductor E⁵, switch K, conductors K¹, K³, wiper C², bar 40, conductor L to the panel strip L¹, pin L², panel strip L³, conductor L⁴, twelve o'clock noon commutator bar, wiper K⁹, conductor K¹⁰, relay K¹², conductor K¹³, the Saturday and Sunday bars on the calendar switch; this circuit would be completed only at twelve-forty on Saturday and Sunday. If these pins were removed, the circuit will not be closed. If the pins are put in any of the other crossings in the program panel corresponding circuits will be closed when the wipers on the hour and minute switches are in the corresponding positions. For both these circuits or any other circuit, the circuit will continue through the wiper B⁹, conductor J¹, conductor H⁷, and battery H⁶, back to the ground. This will energize the relay K¹², and close the bell ringing circuit through switch L⁵. The above refers to the program operated by one of the pairs of hour and minute switches. A different program can be operated by the other pair, the wiring being exactly the same except that in this case there is a conductor M leading from a wiper M¹ in the hour switch through a relay M², conductor M³ to the Monday, Tuesday, Wednesday, Thursday, and Friday bars instead of the Saturday and Sunday bars. Thus on the earlier days of the week a program will be given by one pair of hour and minute switches; on Saturday and Sunday a program will be given by another. There might be other groups or pairs of hour and minute switches or there might be only one. In any event the circuit is only closed through the relays K¹² or M² to energize them and close the bell ringing or other working circuits when the following requirements are completed; the master clock has closed the switch, the hour and minute wipers are on the bars selected and the calendar wiper is on the day selected. The hour and minute combination is selected by placing the program pin in the program panel.

It will be evident that while I have shown in my drawings an operative device, still many changes might be made both in the size, shape and arrangement of parts without departing materially from the spirit of my invention and I wish, therefore, that my showing be regarded as in a sense diagrammatic.

One characteristic of the apparatus which I have discussed, is that the program panel which is the element through which the operator normally controls the program, is not necessarily an integral part of or physically adjacent to the remainder of the apparatus. The program panel may be at any suitable point where the operator can control it and the conductors may lead into it from the hanging apparatus so that the program panel is in a very real sense a remote control station.

I have shown the entire device electrically controlled and operated. It is evident, however, that it might be electric only in part, that is to say, any one of my electric circuits or any separate group of my electric circuits might be associated with other known electric features or operating parts and it will therefore be understood that while I have described the minute, hour and other switches, and shown them as electric switches, the term switch as applied to them does not of necessity imply electric switches. The timing devices might be electrically operated or they might not, and they might control the signals and the working of the interrelating parts by electric means or by other mechanisms.

I claim:

1. In an electric program machine, a plurality of time switches, means for giving them a continuous forward step by step movement, a day switch and means for giving it a forward day by day movement and means for automatically reversing the direction of movement of the day switch for returning it to the starting position at the end of a predetermined number of days, the day switch being operated under the control of the time switch.

2. An hour switch for program machines comprising wiper and twenty-five contact points adapted to be engaged by the wiper, means for moving the wiper in a forward step by step motion from one hour contact to the next and auxiliary wiper moving means controlled by engagement of the wiper with the twenty-fifth contact for moving it into contact with the first contact of the series.

3. In an electric program machine, a day switch, comprising a wiper operating means therefor and a series of contact points, one for each day, means for moving the wiper successively into engagement with said contacts and means controlled by the engagement of the wiper with one of said contacts for returning the wiper to initial position when it has made a predetermined number of steps.

4. In a program machine, a plurality of time switches, means for continuously driving said switches in a step by step movement, a day switch, and means for cyclicly driving the day switch step by step a predetermined number of steps, restoring means tending to oppose the step by step movement of the day switch, means to lock the day switch successively in a predetermined number of forward positions, and means for releasing said locking means at predetermined times, said restoring means at such times returning the day switch to an initial starting position by a continuous movement in a reverse direction.

5. In a program machine, an hour switch mechanism including a series of twenty-five contacts, a contact wiper, time controlled means for moving the wiper step by step to engage the contacts successively, and means controlled by engagement between the wiper and the twenty-fifth contact for moving the wiper into engagement with the first contact of the series.

6. In a program machine, a minute switch mechanism comprising a plurality of minute contacts arranged in a pair of semi-circular parallel banks, there being an equal number of contacts in each bank, a rotatable shaft concentrically disposed with respect to the banks of contacts, a pair of axially spaced diametrically opposed arms carried by the shaft, a wiper carried by each arm, each of said wipers arranged to successively engage the contacts of one bank when the shaft is rotated, said wipers alternately engaging their respective banks.

7. In a program machine, a minute switch mechanism comprising a plurality of minute contacts arranged in a plurality of semi-circular parallel banks, a rotatable shaft concentrically disposed with respect to the banks of contacts, a plurality of axially spaced angularly disposed arms carried by the shaft, a wiper carried by each arm, each of said wipers arranged to successively engage the contacts of one bank when the shaft is rotated, the angularity of said wiper arms being such as to cause one of the wipers to engage the first contact of its bank immediately following the breaking of the engagement between another wiper and the last contact of its bank.

8. In a program machine including a minute switch mechanism, an hour switch mechanism and a day switch mechanism and means for advancing the minute switch mechanism step by step, the combination with the hour switch mechanism and the day switch mechanism, of electro-magnetic driving means for each of said last mentioned switch mechanisms, said electro-magnetic driving means for the hour switch mechanism being energized directly by switch means controlled by the minute switch mechanism and the electro-magnetic driving means for the day switch mechanism being energized by series switches controlled respectively by the minute switch mechanism and the hour switch mechanism.

9. In a program machine including a minute switch mechanism, an hour switch mechanism and a day switch mechanism, electro-magnetic driving means for the hour switch mechanism controlled by the minute switch mechanism, and auxiliary means for energizing the electro-magnetic driving mechanism for the hour switch mechanism for advancing the day switch mechanism said auxiliary means including a relay initially and momentarily energized through the hour switch mechanism and a shunt circuit for bypassing the current around the hour switch mechanism immediately following the initial energization of said relay.

10. In a program machine, a minute switch mechanism, an hour switch and a day switch mechanism, electro-magnetic means controlled by the minute switch mechanism for advancing the hour switch mechanism, electro-magnetic means controlled by the minute switch mechanism and hour switch mechanism for driving the day switch mechanism, auxiliary means for energizing the electro-magnetic hour switch driving mechanism for advancing the day switch mechanism, said auxiliary means including a relay energized through the hour switch mechanism, said relay including a make-before-break switch for energizing a shunt circuit whereby to bypass the relay current around the hour switch mechanism.

11. In a program machine, a day switch, an electro-magnetically operated ratchet mechanism for advancing the switch step by step, spring means biasing the switch to an initial position, locking means retaining the switch in position to which it has been advanced, means responsive to movement of the switch to one of its positions for releasing said locking means to allow the switch to return to its initial position under action of said spring.

12. In a program machine, a day switch including a plurality of "day" contacts, electro-magnetically operated ratchet means for advancing the switch "day" by "day", spring means tending to maintain the switch in an initial position but yielding in response to the force of the electro-magnetic switch advancing means, a locking pawl for retaining the switch in a plurality of advanced positions, a solenoid for releasing the locking pawl, an auxiliary contact on the switch and means responsive to engagement of the contact by the switch for energizing the solenoid to release the pawl, said last mentioned means including a slow acting relay operating to maintain the solenoid energized a sufficient length of time to allow the spring to return the switch to its initial position.

13. In a program machine, an hour switch mechanism including a semi-circular bank of hour contacts, the contact for the first hour being substantially diametrically opposite to the contact for the twenty-fourth hour, and a rotatable contact wiper having diametrically opposed arms disposed concentrically with respect to the bank of contacts and means for rotating said arms whereby as the arms are rotated one arm engages the first hour contact immediately following the breaking of the contact between the other arm and the contact for the twenty-fourth hour.

14. In a program machine, including minute switch mechanism, an hour switch mechanism and a day switch mechanism and means for advancing the minute switch mechanism step by step the combination with the hour and day switch mechanisms, of electro-magnetic means for driving said switches, an auxiliary switch arm driven by the minute switch mechanism, auxiliary contacts engaged by the auxiliary switch arm, the engagement of the auxiliary arm with one of said contacts closing an energizing circuit through the electro-magnetic driving means for the hour switch mechanism.

15. In a program machine, including minute switch mechanism, an hour switch mechanism and a day switch mechanism, and means for advancing the minute switch mechanism step by step the combination with the hour and day switch mechanisms, of electro-magnetic means for driving said switches, an auxiliary switch arm driven by the minute switch mechanism, auxiliary contacts engaged by the auxiliary switch arm, the engagement of the auxiliary arm with one of said contacts closing an energizing circuit through the electro-magnetic driving means for the hour switch mechanism, an auxiliary switch arm driven by the hour switch mechanism and auxiliary contacts engaged by the auxiliary arm of the hour switch mechanism, said auxiliary arm of the hour switch mechanism periodically engaging one of its auxiliary contacts simultaneously with the engagement of the auxiliary arm of the minute switch mechanism with another of its contacts to close an auxiliary circuit through the electro-magnetic driving means for the hour switch mechanism to advance said switch mechanism an extra step.

16. In a program machine, including minute switch mechanism, an hour switch mechanism and a day switch mechanism, and means for advancing the minute switch mechanism step by step the combination with the hour and day switch mechanisms, of electro-magnetic means for driving said switches, an auxiliary switch arm driven by the minute switch mechanism, auxiliary contacts engaged by the auxiliary switch arm, the engagement of the auxiliary arm with one or said contacts closing an energizing circuit through the electro-magnetic driving means for the hour switch mechanism, an auxiliary switch arm driven by the hour switch mechanism and auxiliary contacts engaged by the auxiliary arm of the hour switch mechanism, said auxiliary arm of the hour switch mechanism periodically engaging one of its auxiliary contacts simultaneously with the engagement of the auxiliary arm of the minute switch mechanism with another of its contacts to close an auxiliary circuit through the electro-magnetic driving means for the hour switch mechanism to advance said switch mechanism an extra step, said extra step placing the auxiliary arm of the hour switch mechanism in engagement with another of its auxiliary contacts simultaneously with the engagement of the auxiliary arm of the minute switch with another of its contacts to close a circuit through the electro-magnetic driving means for the day switch mechanism.

17. In a program machine including a minute switch mechanism, an hour switch mechanism and a day switch mechanism and means for advancing the minute switch mechanism step by step, the combination with the hour and day switch mechanisms, of electro-magnetic driving means therefor, circuit controlling means operated by the minute switch mechanism for energizing the electro-magnetic driving means of the hour switch mechanism, an auxiliary switch arm driven by the hour switch mechanism and auxiliary contacts engaged by the auxiliary arm of the hour switch mechanism, the auxiliary arm of the hour switch mechanism periodically engaging one of its auxiliary contacts simultaneously with the closing of the current controlling means operated by the minute switch mechanism to close an auxiliary circuit through the electro-magnetic driving means of the hour switch mechanism to advance said switch mechanism an extra step.

Signed at Chicago, county of Cook and State of Illinois, this 25th day of August, 1923.

HULBERT SANNER.